US011263553B2

(12) United States Patent
Gunn et al.

(10) Patent No.: US 11,263,553 B2
(45) Date of Patent: Mar. 1, 2022

(54) LEARNING COMMANDS AND PARAMETERS FOR AN INTERACTIVE COMMAND LINE INTERFACE

(71) Applicant: International Business Machines Corporation, Armonk, NY (US)

(72) Inventors: Kerry R. Gunn, Kirwan (AU); Keiran W. Robinson, Southport (AU); Rongxing Wang, Benowa (AU)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 16/205,635

(22) Filed: Nov. 30, 2018

(65) Prior Publication Data

US 2020/0175427 A1  Jun. 4, 2020

(51) Int. Cl.
*G06F 16/22* (2019.01)
*G06N 20/00* (2019.01)

(52) U.S. Cl.
CPC ............. *G06N 20/00* (2019.01); *G06F 16/22* (2019.01)

(58) Field of Classification Search
CPC ................................ G06N 20/00; G06F 16/22
See application file for complete search history.

(56) References Cited

U.S. PATENT DOCUMENTS

| 9,231,819 | B2 | 1/2016 | Pasternak |
| 9,692,717 | B2 | 6/2017 | Mares et al. |
| 9,973,451 | B2 | 5/2018 | Mehta et al. |
| 2009/0157884 | A1 | 6/2009 | Anderson et al. |
| 2013/0275596 | A1* | 10/2013 | Subramaniam ......... H04L 41/04 |
| | | | 709/226 |
| 2015/0229645 | A1 | 8/2015 | Keith et al. |
| 2017/0109356 | A1* | 4/2017 | Sawal ................. G06F 16/3322 |
| 2018/0198839 | A1* | 7/2018 | Demulder ............... H04L 41/32 |
| 2020/0073739 | A1* | 3/2020 | Rungta .................... G06F 9/451 |
| 2020/0110695 | A1* | 4/2020 | Maciel ................ G06F 11/3684 |

OTHER PUBLICATIONS

Ochmanski et al., "Smart Term Command Line Interface (CLI) Client", IPCOM000225627D, https://priorart.ip.com/IPCOM/000225627, Feb. 21, 2013, 7 pages.

(Continued)

*Primary Examiner* — Beau D Spratt
(74) *Attorney, Agent, or Firm* — Edell, Shapiro & Finnan, LLC

(57) ABSTRACT

A method, system, and computer program product are provided. A web service learns multiple commands and respective parameters associated therewith for a command line interface application based on the web service providing the respective command and the any respective parameters associated therewith to a command line interface application. A command and each corresponding parameter received for the command line interface application are validated based on the learned commands and respective parameters and provided to the command line interface application. Each of the validated parameters are provided in response to the web service receiving from the command line interface application respective indications for more input. A successful indication is provided to an originator of the new input in response to the web service receiving a successful indication from the command line interface application.

20 Claims, 5 Drawing Sheets

(56) References Cited

OTHER PUBLICATIONS

Lablans et al., "A RESTful Interface to Pseudonymization Services in Modern Web Applications", BMC Medical Informatics and Decision Making 2015,15:2, https://bmcmedinformdecismak.biomedcentral.com/articles/10.1186/s12911-014-0123-5, 2015, pp. 1-10.

* cited by examiner

LEARNING COMMANDS AND PARAMETERS FOR AN INTERACTIVE COMMAND LINE INTERFACE

BACKGROUND

1. Technical Field

Present invention embodiments relate to a web service that learns interactions with an interactive interface application as the interactions are encountered in order to validate later interactions.

2. Discussion of the Related Art

Today, software is delivered to a wider and more dispersed user base via a cloud. The software can be run remotely by calling a RESTful web service. If a software application requires user interaction, the RESTful web service can remotely run the software application provided that the RESTful web service knows the required interactions for running particular tasks using the software application.

SUMMARY

According to one embodiment of the present invention, a computer-implemented method is provided for a web service to interface with a command line interface application. The web service, executing on a computing device, learns each of multiple commands and any respective parameters associated therewith for the command line interface application based on the web service providing the respective command and the any respective parameters associated therewith to the command line interface application. The web service validates a command and each corresponding parameter received for the command line interface application based on the learned commands and respective parameters and provides the validated command and the each validated parameter to the command line interface application. Each of the validated parameters are provided in response to the web service receiving from the command line interface application respective indications for more input. The web service provides a successful indication to an originator of the command in response to receiving a successful indication from the command line interface application.

According to a second embodiment of the present invention, a system is provided for executing a web service to interface with a command line interface application. The system includes at least one processor and a memory connected to the at least one processor. The at least one processor is configured such that the web service executing on the at least one processor learns each of multiple commands and any respective parameters associated therewith for the command line interface application based on the web service providing the respective command and the any respective parameters associated therewith to the command line interface application. The web service validates a command and each corresponding parameter received for the command line interface application based on the learned commands and respective parameters and provides the validated command and the each validated parameter to the command line interface application. The each validated parameter is provided to the command line interface application in response to the web service receiving from the command line interface application respective indications for more input. The web service provides a successful indication to an originator of the new input in response to receiving a successful indication from the command line interface application.

According to a third embodiment of the present invention, a computer program product including at least one computer readable storage medium having computer readable program code embodied therewith is provided for execution on at least one processor of a computing device. The computer readable computer code is configured to be executed as a web service by the at least one processor. The web service learns each of multiple commands and any respective parameters associated therewith for a command line interface application based on the as the web service providing the respective command and the any respective parameters associated therewith to the command line interface application. The web service validates a command and each corresponding parameter based on the learned commands and respective parameters and provides the validated command and the each validated parameter to the command line interface application. Each of the validated parameters is provided in response to the web service receiving from the command line interface application respective indications for more input. The web service provides a successful indication to an originator of the command in response to receiving a successful indication from the command line interface application.

BRIEF DESCRIPTION OF THE DRAWINGS

Generally, like reference numerals in the various figures are utilized to designate like components.

DETAILED DESCRIPTION

Many different legacy software applications require user interactions to run to completion. To remotely execute such legacy software applications, a RESTful web service may be called. However, interactions may vary among different tasks and the RESTful web service should know or have a way of obtaining knowledge of the required interactions to remotely execute the different tasks.

One possible solution would be to write a specific web service for each target application declaring user input in advance. However, this solution would require developer time for each target application and, if not all user interaction paths are considered by the developer, errors may be introduced.

Another possible solution would include having the web service request more information from the user each time the target application requests user input. However, the user may receive numerous requests and provide numerous responses until a full interaction is completed.

In embodiments of the invention, a web service is provided for front-ending an interactive interface application. In some embodiments, the web service may be a RESTful web service and the application may be a command line interface application. The web service may learn commands and their associated parameters as the commands and the associated respective parameters are first received and provided to the command line interface application. The web service learns one or more commands and one or more respective sets of parameters associated therewith to form at least one complete command for the command line interface application.

When one of the one or more commands and a respective set of parameters associated therewith are received after being learned, the web service may validate the one command and the respective set of parameters before providing the one command and the respective set of parameters to the command line interface application. Each parameter of the respective set of parameters may be provided individually to the command line interface application after the web service receives respective indications for more input from the command line interface application in response to the web service providing the command line interface application with a command or a parameter. When either the provided command or one of the respective set of parameters is determined to be invalid, an error indication may be provided to a user who originated the one command and the respective set of parameters. In some embodiments, when the error indication is provided to the user, the error message may indicate which of the provided command or the provided parameter is invalid and may include information regarding a valid command or an expected parameter.

Figure 1:
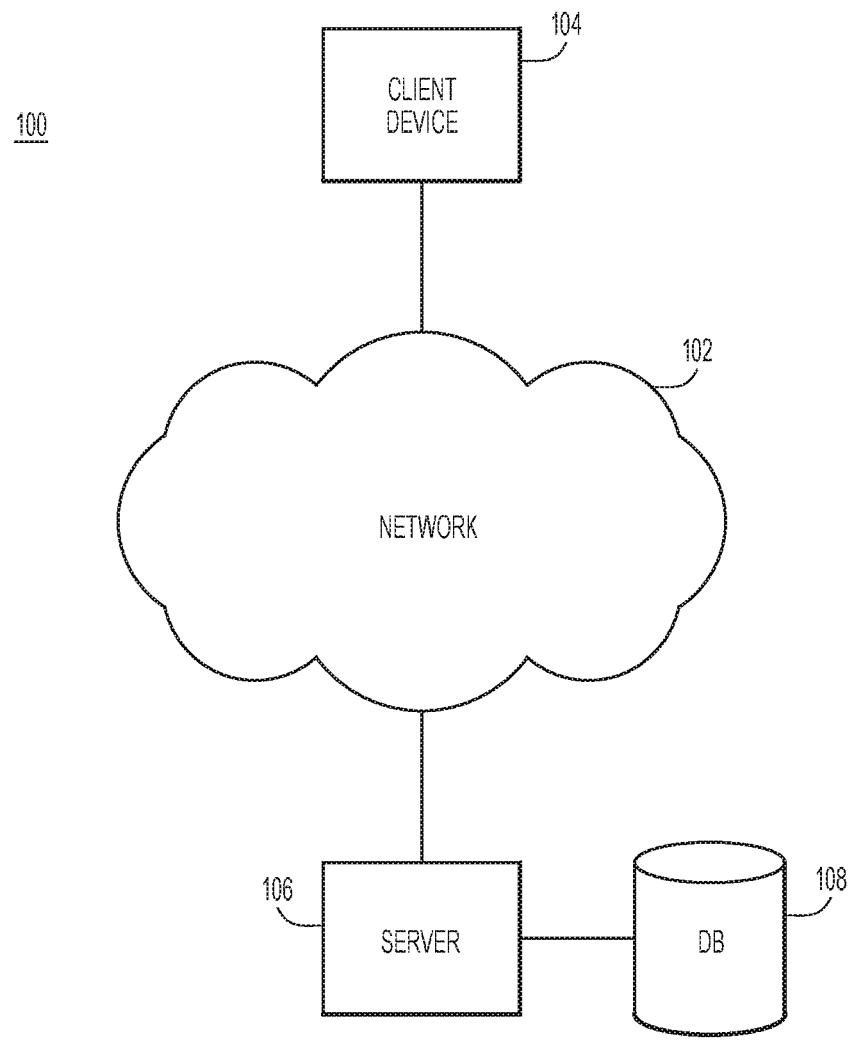
FIG. 1 shows an example operating environment according to embodiments of the invention.

An example environment 100 for use with present invention embodiments is illustrated in FIG. 1. Specifically, environment 100 may include a client device 104, a network 102, a server 106 and a database 108. In some embodiments, server 106 may include multiple processing devices configured as a server farm. Client device 104 and server 106 may be remote from each other and may communicate over network 102. Network 102 may be implemented by any number of any suitable communications media (e.g., wide area network (WAN), local area network (LAN), Internet, Intranet, etc.). Alternatively, client device 104 and server 106 may be local to each other, and may communicate via any appropriate local communication medium (e.g., local area network (LAN), hardwire, wireless link, Intranet, etc.). In some embodiments, database 108 may be directly connected to server 106 or may be included on one or more storage devices of a separate processing device (not show) connected to network 102.

Figure 2:
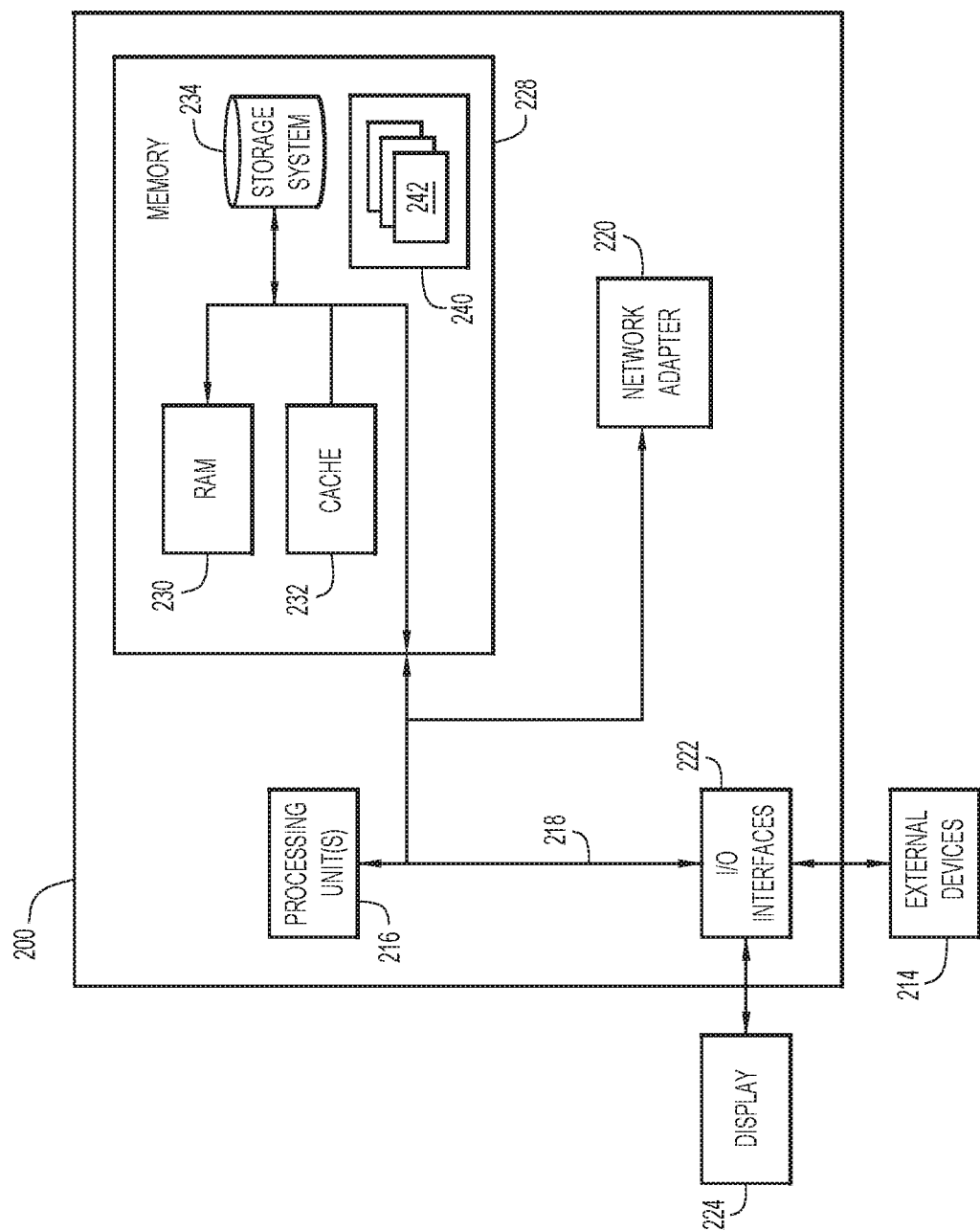
FIG. 2 is a block diagram of a computer system for implementing a processing device, a client device, or a server according to embodiments of the invention.

Referring now to FIG. 2, a schematic of an example computer system 200 is shown, which may implement client device 104, server 106 and a processing device directly connected to database 108 in various embodiments. Computer system 200 is shown in a form of a general-purpose computing device. Components of computer system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 200 may include a variety of computer system readable media. Such media may be any available media that is accessible by computer system 200, and may include both volatile and non-volatile media, removable and non-removable media.

System memory 228 can include computer system readable media in the form of volatile memory, such as random access memory (RAM) 230 and/or cache memory 232. Computer system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 200 may also communicate with one or more external devices 214 such as a keyboard, a pointing device, one or more displays 224, one or more devices that enable a user to interact with computer system 200, and/or any devices (e.g., network card, modem, etc.) that enable computer system 200 to communicate with one or more other computing devices. Such communication can occur via Input/Output (I/O) interfaces 222. Still yet, computer system 200 can communicate with one or more networks such as a local area network (LAN), a general wide area network (WAN), and/or a public network (e.g., the Internet) via network adapter 220. As depicted, network adapter 220 communicates with the other components of computer system 200 via bus 218. It should be understood that, although not shown, other hardware and/or software components could be used in conjunction with computer system 200. Examples, include, but are not limited to: a microphone, one or more speakers, microcode, device drivers, redundant processing units, external disk drive arrays, RAID systems, tape drives, and data archival storage systems, etc.

Figure 3:
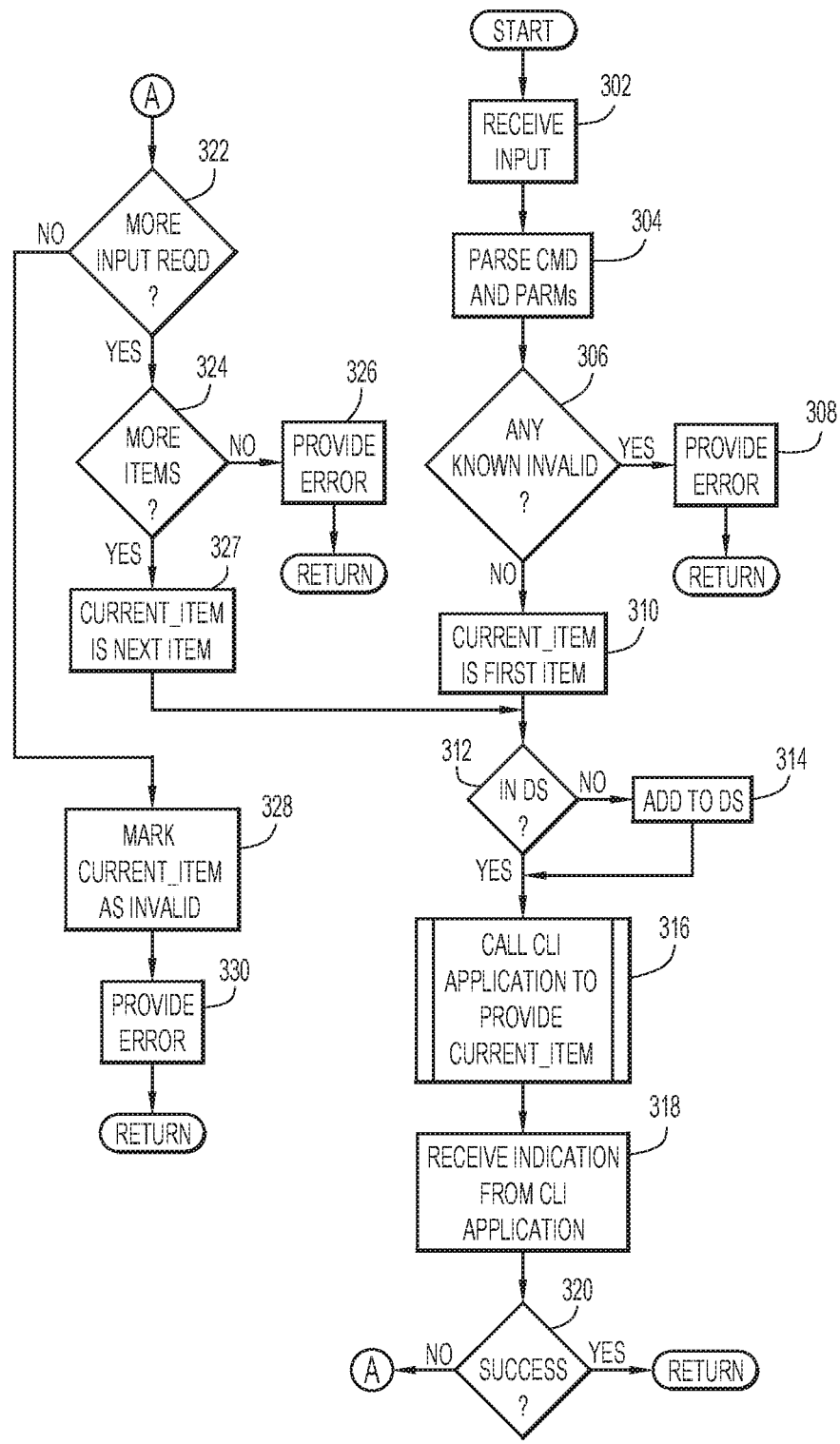
FIG. 3 is a flowchart that illustrates example processing of a web service according to embodiments of the invention.

FIG. 3 is a flowchart illustrating example processing in an embodiment of the invention. The process may begin with a RESTful or other web service receiving input from a user (act 302) for a command line interface application. The user may provide the input via client device 104, which provides the input to the web service via network 102. The web service may then parse the input in order to extract a command and any associated one or more parameters included in the input (act 304).

The web service may then determine whether any of the command and the associated one or more parameters are known to be invalid (act 306). In one embodiment, this may be accomplished by first checking for an entry in a data structure that matches the command in the input. If a matching entry does not exist in the data structure, then the command was not previously encountered by the web service and therefore, not yet learned. Such a command and its parameters are considered not to be known as invalid. If a matching command is found in the data structure, an invalidity flag in the data structure for that command is checked to determine whether the command is known to be invalid. If the command is stored in the data structure and not known to be invalid, then a next parameter in the input is checked for a matching entry in the data structure for the command. If the matching entry is found, it's corresponding invalidity flag is checked to determine whether the parameter is known to be invalid. Each of the one or more parameters is checked in this way until either a first invalid parameter is found or none of the parameters are known to be invalid. If a matching entry for a parameter is not found in the data structure, then that parameter and any following parameters are considered to be not known as invalid.

If, during act 306, any of the command and the one or more parameters provided in the input are known to be invalid, then an error indication may be provided by the web service to an originator of the input (act 308) and the process may be completed. The error indication may indicate the invalid command or the invalid parameter. If the error indication concerns a parameter, in some embodiments, the error message may provide information regarding a type of parameter expected. This will be discussed in more detail later in the specification.

If, during act 306, none of the inputted command and the one or more parameters are known to be invalid, then a current item in the input is set to a first item in the input (act 310) and the data structure is checked to determine whether the data structure includes a matching entry for the current item in the input (act 312). If the data structure does not include a match for the current item in the input, then a matching entry may be added to the data structure (act 314). In some embodiments, the data structure may be stored in a database.

The command line interface application may be called by the web service to provide the current item to the command line interface application (act 316). The web service may receive an indication from the command line interface application in response to providing the current item thereto. The web service may determine whether the received indication is a success indication, thereby indicating that the command was executed successfully (act 320). If the received indication is the success indication, the process may then be completed and the originator of the input may be informed of the successful execution. Otherwise, the web service may determine whether the received indication is a more input indication indicating that the command line interface application requires more input from the web service (act 322).

If the received indication is the more input indication, the web service may determine whether additional items are provided in the input (act 324). If no additional items are provided in the input, then the web service may provide an error indication to the originator of the input to indicate that more input was expected and not provided (act 326). The process may then be completed.

If, during act 324, one or more items are provided in the received input, then the next item in the input becomes the current item (act 327) and acts 312-320 again may be performed.

If, during act 322, the indication received from the command line interface application does not indicate that more input is required, then the invalidity flag for the current item in the data structure is set to indicate that the current item is invalid (act 328) and an error indication may be provided to the originator of the input (act 330). In some embodiments, the error message may indicate a type of input expected. The process may then be completed.

Figure 4:
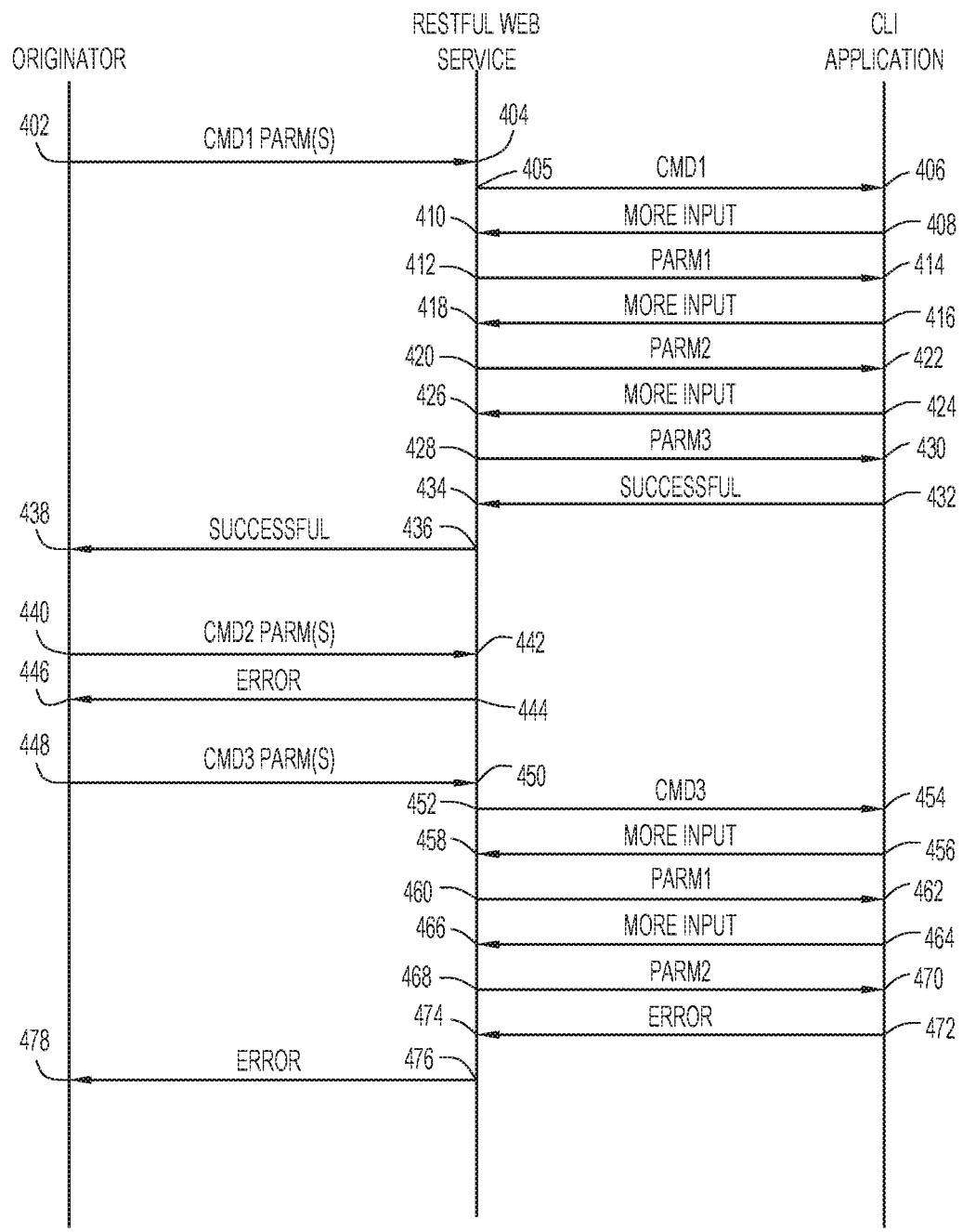
FIG. 4 is a flow diagram illustrating example operation of a web service according to embodiments of the invention.

FIG. 4 is a flow diagram illustrating operation of an embodiment of a RESTful or other web service executing in server 106 as a front end to a command line interface application, which may be executing on a processing device (not shown) connected to network 102 or on server 106. An originator of input for a command line interface application may provide the input for the command line interface application to client device 104, which may provide the input to the web service via network 102 (402). The input may include a command and one or more parameters associated with the command. The input may be received by server 106 executing the web service (404), which may parse the received input to extract the command and the one or more parameters. Assuming that the command was not previously received by the web service, the command may be stored in an entry of a data structure, which may be included in a database (405), and the web service then may provide the command to the command line interface application (406). Assuming that the command is a valid command, the command line interface application receives the command, determines that more input is required and sends a more input indication to the web service (408), which receives the more input indication (410). The web service may then include a first parameter from the input in an entry of the data structure associated with the command and may provide the first parameter to the command line interface application (412). The command line interface application may receive the first parameter (414), may determine that more input is required, and may provide a more input indication to the web service (416). The web service may receive the more input indication (418), may store a second parameter in the data structure associated with the command and may provide the second parameter to the command line interface application (420). The command line interface application may receive the second parameter (422), may determine that more input is required and may provide a more input indication to the web service (424). The web service may receive the more input indication (426), may store a third parameter in the data structure associated with the command and may provide the third parameter to the command line interface application (428). The command line interface application may receive the third parameter and may determine that no additional input is required (430). The command line interface application may successfully execute the command and may provide a successful indication to the web service (432). The web service may receive the successful indication (434) and may provide a successful indication to the client device 104 (436), which receives the successful indication and may indicate to the originator of the input that the command executed successfully (438).

At a later point in time, the originator may provide a second input to client device 104 for the command line interface application and client device 104 may provide the second input to the web service (440). The web service may receive the second input (442) and may parse the second input to extract the second command and the one or more parameters associated therewith. The web service may access the data structure and may attempt to validate the received input. In this example, a matching entry may exist in the data structure and may have its invalidity flag set to indicate that the one of the second command and the one or more parameters is invalid. As a result, the web service may provide an error indication to the client device 104 (444). Client device 104 may receive the error indication (446) and may provide the originator of the second input with an error indication. The error indication may provide information regarding which of the second command and the one or more parameters caused the error and may include information regarding a command or a parameter that should have been provided.

Sometime later, an originator provides a third input to client device 104 for the command line interface application, which may provide the third input to the web service (448). The third input includes a command and parameters not previously received by the web service. At 450, the web service receives the third input and parses the third input to extract the command and the parameters included therein. The web service then adds the received command to an entry in the data structure and provides the command to the command line interface application (452). The command line interface application receives the command (454), determines that more input is required, and sends a more input indication to the web service (456). The web service receives the more input indication (458), adds a first parameter from the third input to the data structure for the command and provides the first parameter to the command line interface application (460). The command line interface application receives the first parameter (462), determines that more input is required, and provides the more input indication to the web service (464). The web service receives the more input indication (466), adds a second parameter to the data structure for the command, and provides the second parameter to the command line interface application (468). The command line interface application receives the second parameter (470), determines that the second parameter is invalid and provides an error indication to the web service (472). The error indication may include information regarding one or more types of parameters expected to be received by the command line interface application. The web service receives the error indication (474) and provides an error indication to client device 104 (476). Client device 104 receives the error indication and informs the originator of the third input of the error (478).

As previously mentioned, in the various embodiments the RESTful or other web service learns commands and their associated parameters as they are first received from an originator of input for the command line interface application. As commands and parameters are learned, the web service may build a data structure, which may later be used to validate commands and parameters associated therewith. In some embodiments, the data structure may be stored in a database. A root entry of the data structure may include identifiers to respective entries that include a respective command. Each respective command entry may include one or more identifiers to one or more corresponding entries including a respective first possible parameter. Each respective entry that includes a possible parameter associated with a command includes either one or more identifiers of entries including a next possible parameter of the command or an indication that no possible parameters follow the respective entry. Further, each respective entry may include an invalidity flag that may indicate whether the respective entry includes an invalid entry.

Figure 5:
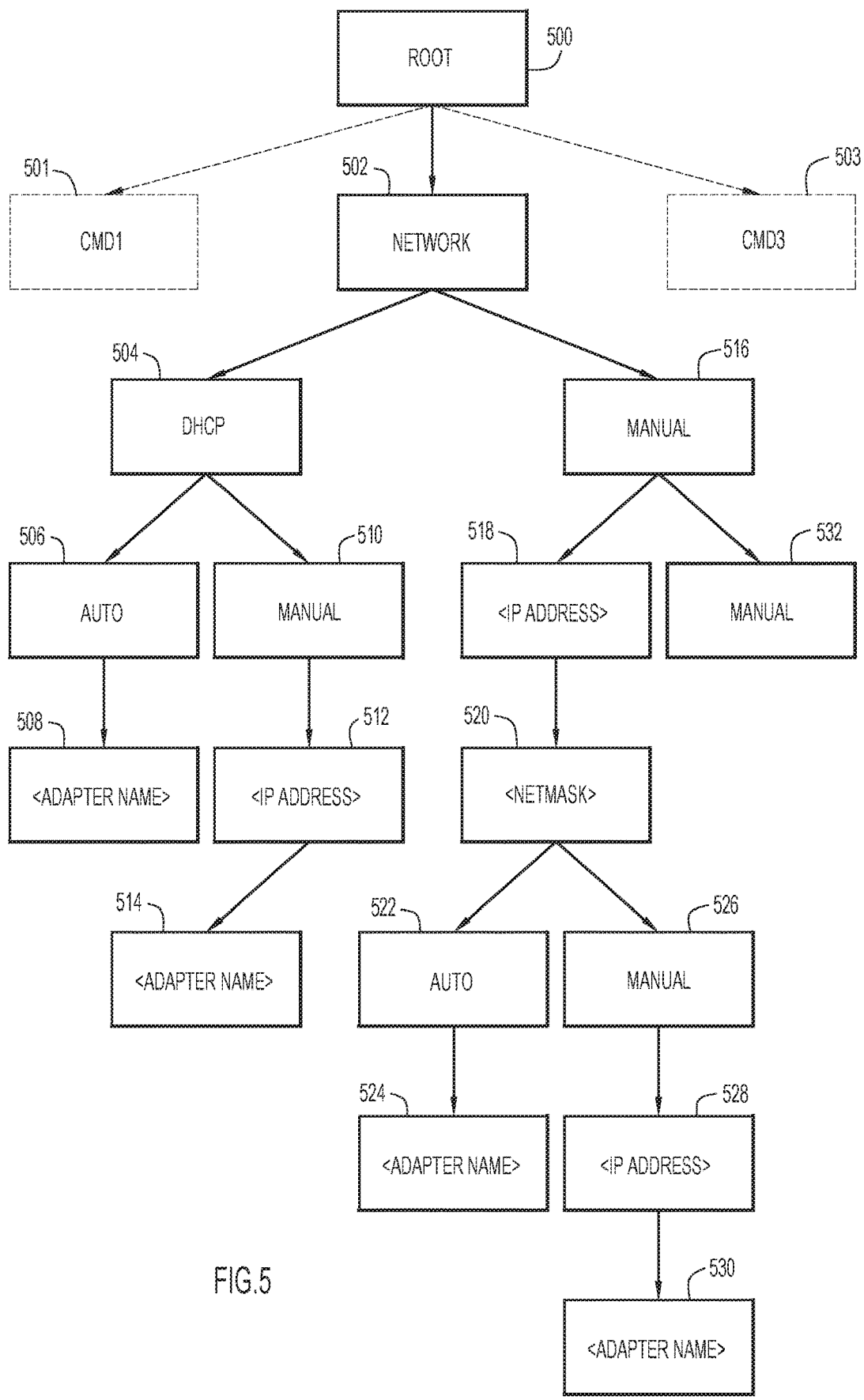
FIG. 5 illustrates use of a data structure according to various embodiments of the invention.

FIG. 5 illustrates an example data structure. The data structure is initially empty. Suppose the RESTful or other web service receives a first input including a network command and one or more parameters associated therewith. For example, the input may include "network dhcp maual <ip address> <adapter name>", where <ip address> indicates an Internet Protocol (IP) address and <adapter name> indicates a name of an adapter. The web service may parse the first input to extract the command and the one or more parameters. The web service may determine that the command is a network command, which is currently not included in the data structure, may add the network command to entry 502 of the data structure, and may provide the network command to the command line interface application. Root entry 500 of the data structure may store an identifier of entry 502, which includes the network command.

Assuming that the command line interface application receives the network command and responds to the web service with a more input indication, the web service may add a first parameter from the first input, which may be dhcp, to entry 504 of the data structure, may store an identifier of entry 504 into entry 502, and may provide dhcp to the command line interface application.

Assuming that the command line interface application receives the dhcp parameter and responds to the web service with a more input indication, the web service may add a next parameter after dhcp, manual, from the received first input to entry 510 of the data structure as a possible second parameter following the dhcp parameter. An identifier for entry 510 may be stored into entry 504 and the manual parameter may be provided to the command line interface application.

Assuming that the command line interface application receives the manual parameter and responds to the web service with a more input indication, the web service may determine that the next parameter after manual is an IP address and may store an IP address type as a type of the next parameter in entry 512. An identifier for entry 512 may be stored into entry 510 of the data structure and the web service may provide the IP address to the command line interface application.

Assuming that the command line interface application receives the IP address and responds to the web service with a more input indication, the web service may determine that the next parameter after the IP address is an adapter name type of parameter and my store the adapter name type as a type of the next parameter in entry 514. An identifier for entry 514 may be stored into entry 512 of the data structure and the web service may provide the adapter name to the command line interface application.

Assuming that the command line interface application receives the adapter name, the command line interface application may determine that no additional input is required, may execute the complete network command, and may return a successful indication to the web service, which may provide client device 104 with a successful indication. Client device 104 then may inform the originator of the successful execution of the received command.

Now assume that the RESTful web service received two more inputs from the originator including "network manual <ip address> <netmask> auto <adapter name>" and "network manual <ip address> <netmask> manual <ip address>", where < > indicates a type of parameter, and entries 516 through 530 are added to the data structure in a same manner as previously described. A next input from the originator includes "network manual manual". The web service may receive and parse the next input to extract the network command and the parameters manual and manual. The web service then may determine whether the provided command or any parameter is known to be invalid. Assuming that this is the first time that the web service received the command "network manual" followed by a second parameter of manual, the web service may determine that the command and associated parameters are not known to be invalid. The web service then may determine that the command, network, is in entry 502 of the data structure and may provide the command, network, to the command line interface application.

Assuming that the command line interface application receives the network command, the command line interface application may provide a more input indication to the RESTful web service. The RESTful web service may then determine that the first parameter is manual, which matches entry 516 of the data structure. The RESTful web service then may provide the first parameter, manual, to the command line interface application.

Assuming that the command line interface application receives the first manual parameter, the command line interface application may provide a more input indication to the RESTful web service. The RESTful web service may then determine that the second parameter also is manual, which is not included in the data structure. The RESTful web service may then add the second manual parameter to entry 532 of the data structure and may store an identifier for entry 532 into entry 516. The RESTful web service then may provide the second manual parameter to the command line interface application.

The command line interface application receives the second manual parameter and may determine that this parameter is invalid. As a result, the command line interpreter may provide an error indication to the RESTful web service, which receives the error indication and sets an invalidity flag included in entry 532 to true. The error indication may include information indicating the error and further indicating that an IP address was expected as the next parameter.

With entry 532 having its invalidity flag set to true, the web service has learned that input including "network manual" followed by a second manual is invalid and will automatically respond to the originator of the input with an error indication instead of providing any portion of the received input to the command line interface application.

At a later point in time, the web service may receive a command such as, for example, CMD1, from an originator of input including the command. Assuming that this command is not already included in the data structure, the web service may store the command in entry 501 of the data structure and an identifier of entry 501 may be stored in root entry 500. The command may then be provided to the command line interface application. If the command line interface application responds to the web service with an error indication, entry 501 may have its invalidity flag set to true and an error indication may be provided to the originator of the input.

Similarly, at a later time, the web service may receive a command such as, for example, CMD3, from an originator of input including the command. Assuming that this command is not already included in the data structure, the web service may store the command in entry 503 of the data structure and an identifier of entry 503 may be stored in root entry 500. The command may then be provided to the command line interface application. If the command line interface application responds to the web service with an error indication, entry 503 may have its invalidity flag set to true and an error indication may be provided to the originator of the input.

It will be appreciated that the embodiments described above and illustrated in the drawings save processing time by not having the command line interface application repeatedly process invalid commands, and provide interactive input for a legacy application such as, for example, a command line interface application, without repeatedly prompting a user to provide each input. These represent only a few of the many ways of implementing embodiments of a RESTful or other web service that front-ends a command line interface application and learns the interactions therebetween.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for a web service to interface with a command line interface application, the method comprising:
   learning, by the web service executing on a computing device, each of a plurality of commands and any respective parameters associated therewith for the command line interface application based on the web service providing the respective command and the any respective parameters associated therewith to the command line interface application;
   validating, by the web service, a command and each of one or more corresponding parameters received for the command line interface application based on the learned commands and respective parameters;
   providing, by the web service, the validated command without a corresponding parameter to the command line interface application;
   providing, by the web service, the one or more validated parameters individually to the command line interface application, wherein a validated parameter of the one or more validated parameters is provided to the command line interface application for each indication for more input received from the command line interface application in response to the web service providing a prior item, wherein the prior item includes one of the validated command and a previously provided validated parameter; and
   providing, by the web service, a successful indication to an originator of the command in response to receiving a successful indication from the command line interface application after providing the validated command and each validated parameter.

2. The method of claim 1, wherein the learning further comprises:
   adding, by the web service, one or more items of an input for the command line interface application to a data structure when the one or more items are not already included therein.

3. The method of claim 2, wherein:
   the data structure is stored in a database,
   the data structure is arranged to store a corresponding command for the command line interface application, and
   the data structure is arranged to store a sequence of at least one parameter associated with the corresponding command such that the data structure indicates a specific order for each of the at least one parameter of the sequence.

4. The method of claim 2, wherein the learning further comprises:
   marking as invalid, by the web service, an item added to the data structure when the web service receives from the command line interface application an indication that the item is not valid.

5. The method of claim 4, wherein the method further comprises:
   providing, by the web service, an error indication to an originator of the input when the web service receives from the command line interface application the indication that the item is not valid.

6. The method of claim 4, further comprising:
   receiving, by the web service, a second input for the command line interface application, the second input having a second plurality of items including a second command and at least one parameter associated therewith;

determining, by the web service, that one of the second plurality of items is known to be invalid due to the one of the second plurality of items being marked as invalid for the second command in the data structure; and providing, by the web service, an error indication to an originator of the second input in response to the determining that the one of the second plurality of items is known to be invalid.

7. The method of claim 1, further comprising:

receiving, by the web service, a second input for the command line interface application, the second input including a second plurality of items further including a second command and at least one parameter associated therewith;

determining, by the web service, that one of the second plurality of items is invalid due to the one of the second plurality of items being one of an incorrect parameter for the second command and a correct parameter for the second command provided in an incorrect sequence for the second command; and providing, by the web service, an error indication to an originator of the second input in response to determining one of the second plurality of items is invalid.

8. A system for executing a web service to interface with a command line interface application, the system comprising:

at least one processor; and a memory connected to the at least one processor, the at least one processor being configured to perform:

learning, by the web service executing on the at least one processor, each of a plurality of commands and any respective parameters associated therewith for the command line interface application based on the web service providing the respective command and the any respective parameters associated therewith to the command line interface application;

validating, by the web service, a command and each of one or more corresponding parameters received for the command line interface application based on the learned commands and respective parameters;

providing, by the web service, the validated command without a corresponding parameter to the command line interface application;

providing, by the web service, the one or more validated parameters individually to the command line interface application, wherein a validated parameter of the one or more validated parameters is provided to the command line interface application for each indication for more input received from the command line interface application in response to the web service providing a prior item, wherein the prior item includes one of the validated command and a previously provided validated parameter; and providing, by the web service, a successful indication to an originator of the command in response to receiving a successful indication from the command line interface application after providing the validated command and each validated parameter.

9. The system of claim 8, wherein the learning further comprises:

adding one or more items of an input for the command line interface application to a data structure when the one or more items are not already included therein.

10. The system of claim 9, wherein:

the data structure is stored in a database, the data structure is arranged to store a corresponding command for the command line interface application, and the data structure is arranged to store a sequence of at least one parameter associated with the corresponding command such that the data structure indicates a specific order for each of the at least one parameter of the sequence.

11. The system of claim 9, wherein the learning further comprises:

marking as invalid an item added to the data structure when the web service receives from the command line interface application an indication that the item is not valid.

12. The system of claim 11, wherein the web service is configured to perform:

providing an error indication to an originator of the input when the web service receives from the command line interface application the indication that the current item is not valid.

13. The system of claim 11, wherein the web service is configured to perform:

receiving a second input for the command line interface application, the second input having a second plurality of items including a second command and at least one parameter associated therewith;

determining that one of the second plurality of items is known to be invalid due to the one of the second plurality of items being marked as invalid for the second command in the data structure; and providing an error indication to an originator of the second input in response to the determining that the one of the second plurality of items is known to be invalid.

14. The system of claim 8, wherein the web service is configured to perform:

receiving a second input for the command line interface application, the second input including a second plurality of items further including a second command and at least one parameter associated therewith;

determining that one of the second plurality of items is invalid due to the one of the second plurality of items being one of an incorrect parameter for the second command and a correct parameter for the second command provided in an incorrect sequence for the second command; and providing an error indication to an originator of the second input in response to determining one of the second plurality of items is invalid.

15. A computer program product comprising at least one non-transitory computer readable storage medium having computer readable program code embodied therewith for execution on at least one processor of a computing device, the computer readable program code being configured to be executed as a web service by the at least one processor to perform:

learning each of a plurality of commands and any respective parameters associated therewith for a command line interface application based on the web service providing the respective command and the any respective parameters associated therewith to the command line interface application;

validating a command and each of one or more corresponding parameters received for the command line interface application based on the learned commands and respective parameters;

providing the validated command without a corresponding parameter to the command line interface application;

providing the one or more validated parameters individually to the command line interface application, wherein a validated parameter of the one or more validated parameters is provided to the command line interface application for each indication for more input received from the command line interface application in response to the web service providing a prior item, wherein the prior item includes one of the validated command and a previously provided validated parameter; and providing a successful indication to an originator of the command in response to receiving a successful indication from the command line interface application after providing the validated command and each validated parameter.

16. The computer program product of claim 15, wherein the learning further comprises:

adding one or more current items of an input for the command line interface application to a data structure when the one or more items are not already included therein.

17. The computer program product of claim 16, wherein:

the data structure is stored in a database, the data structure is arranged to store a corresponding command for the command line interface application, and the data structure is arranged to store a sequence of at least one parameter associated with the corresponding command such that the data structure indicates a specific order for each of the at least one parameter of the sequence.

18. The computer program product of claim 16, wherein the learning further comprises:

marking as invalid an item added to the data structure when the web service receives from the command line interface application an indication that the item is not valid.

19. The computer program product of claim 18, wherein the web service is configured to perform:

providing an error indication to an originator of the input when the web service receives from the command line interface application the indication indicating that the item is not valid.

20. The computer program product of claim 18, wherein the web service is configured to perform:

receiving a second input for the command line interface application, the second input having a second plurality of items including a second command and at least one parameter associated therewith;

determining that one of the second plurality of items is known to be invalid due to the one of the second plurality of items being marked as invalid for the second command in the data structure; and providing an error indication to an originator of the second input in response to the determining that the one of the second plurality of items is known to be invalid.

* * * * *